Patented Nov. 10, 1953

2,658,404

UNITED STATES PATENT OFFICE 2,658,404

MACHINE TOOL DRIVE

William Wallace Potter and Alfred Joseph Fuller, Pawtucket, R. I., assignors to Niles-Bement-Pond Company, West Hartford, Conn., a corporation of New Jersey Application August 8, 1947, Serial No. 767,460, now Patent No. 2,561,753, dated July 24, 1951, which is a division of application Serial No. 537,490, May 26, 1944, now Patent No. 2,455,876, dated December 7, 1948. Divided and this application November 25, 1949, Serial No. 129,204

3 Claims. (Cl. 74—331)

The present invention relates to a change-speed mechanism applicable to machines having a movable part or member to be driven selectively at different speeds and has particular application to machine tools and especially those machine tools having a rotatable spindle and a cooperating reciprocating part or carriage movable to and fro relative to the spindle, the latter supporting the work-piece and said carriage supporting a tool holder, or vice versa.

This application is a division of application Serial No. 767,460 filed August 8, 1947 now Patent No. 2,561,753, which is a division of application Serial No. 537,490 filed May 26, 1944 now Patent No. 2,455,876.

In machine tools, the rotative movement of the spindle is termed the "speed" and the movement of the reciprocating part or carriage or slide is divided into fast or idle motion and slow or work performing motion, the latter motion being termed the "feed."

The object of the present invention is the provision of a very simple, less expensive, novel and efficient change-speed mechanism that includes a device for obtaining at least four speed-changes of the spindle and a device for obtaining fast motion and at least three feed-changes of the slide and carriage in a manner which will insure that no damage will be done to the machine, or the instrumentality operated by the machine, or to the work-piece, being operated on or by the machine.

Another object of the invention is the provision of means in the spindle speed-change mechanism for changing the speed range of the machine, independently of the speed-change device or the usual hand-change gears, whereby the range of the machine may be increased or decreased for different classes of materials being worked-upon, thus greatly widening the capacity and use of the machine.

While speed-change and feed-change devices are numerous in the art, it is believed that the construction and organization of parts of the present invention is novel, and since its utility has been proven, it constitutes a valuable improvement in the art.

The invention, therefore, resides in that which is shown and described and particularly pointed out in the appended claims.

In the drawings which show preferred embodiment of the invention as now devised and used—

Figure 3:
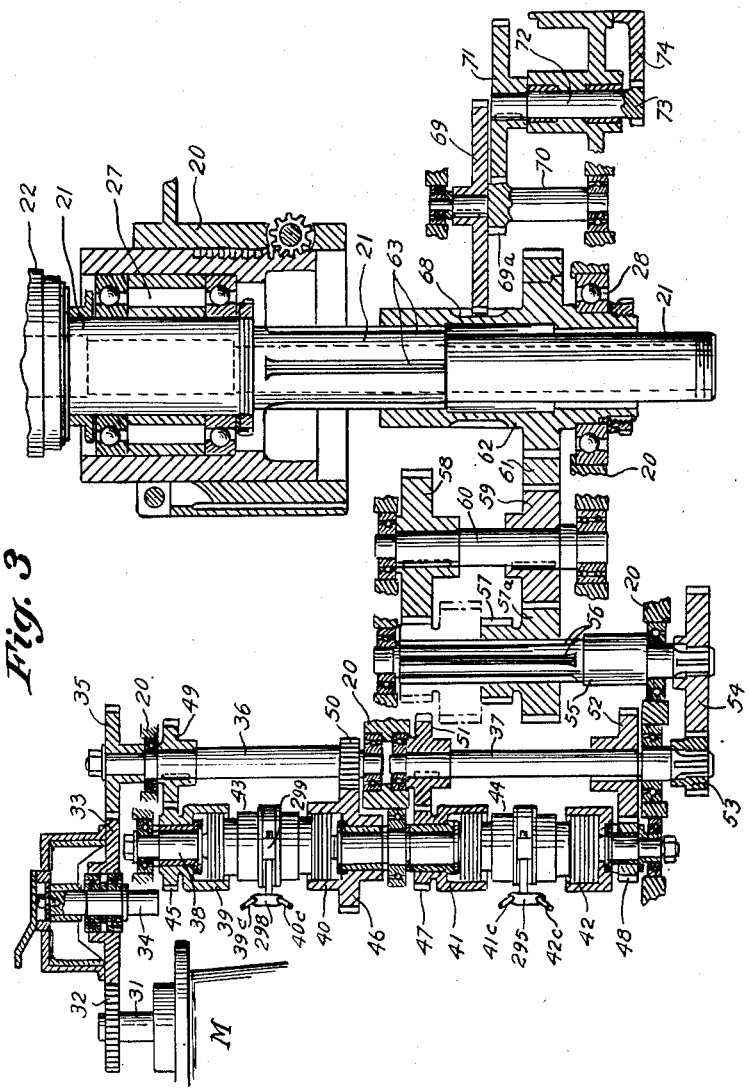
Figure 4:
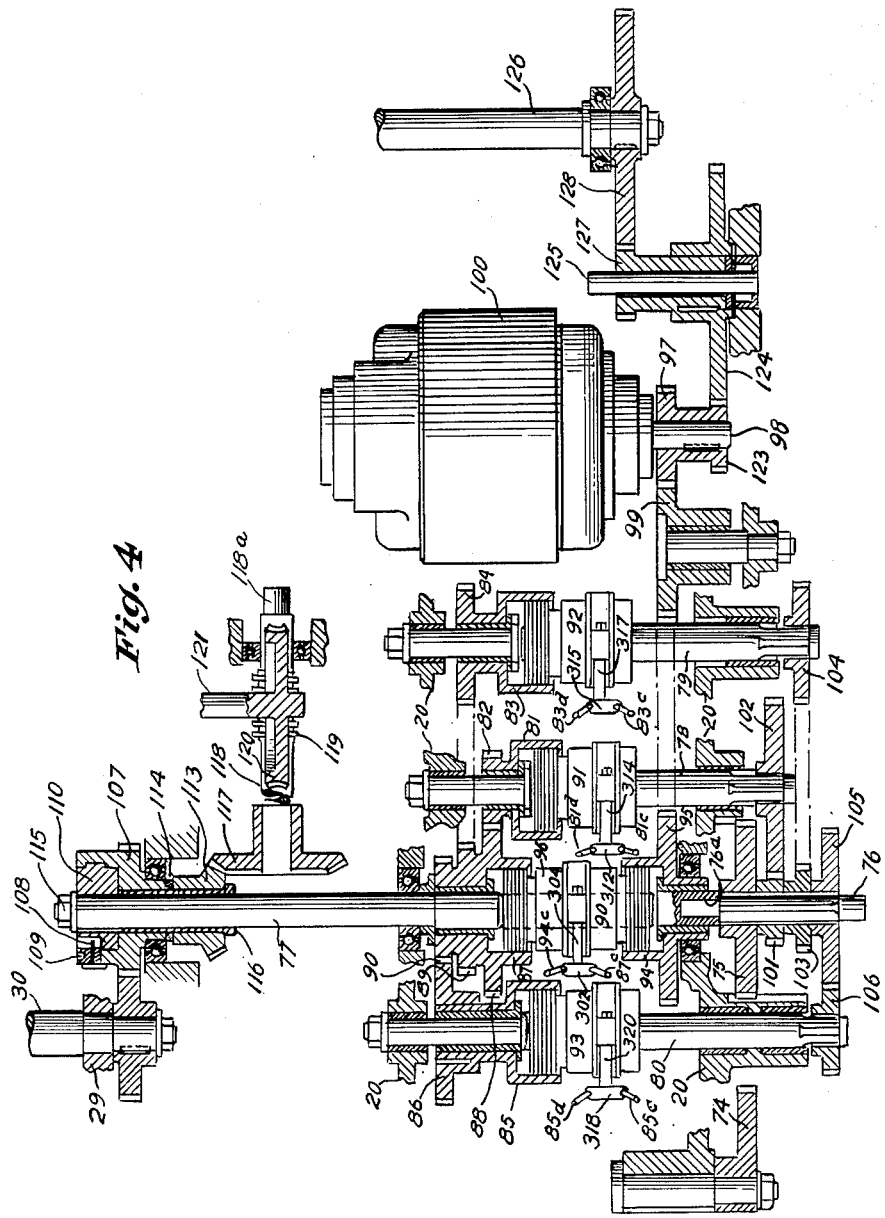

Figures 3 and 4 illustrate a lay-out of the gearing and are to be read together, Figure 3 being the drive between the source of power for the machine and its spindle 21 in which drive the spindle speed-change mechanism of this invention is interposed and Figure 4 being the drive between the spindle 21 and the slide or carriage 23 or 25 in which drive the "feed-change" mechanism of this invention is interposed.

Throughout the specification and drawings the like characters and references denote similar and like parts in the several views. In order that a better understanding may be had of the present invention a brief description will now be given of the machine tool with which the present invention is illustrated as one example of its application.

Figure 1:
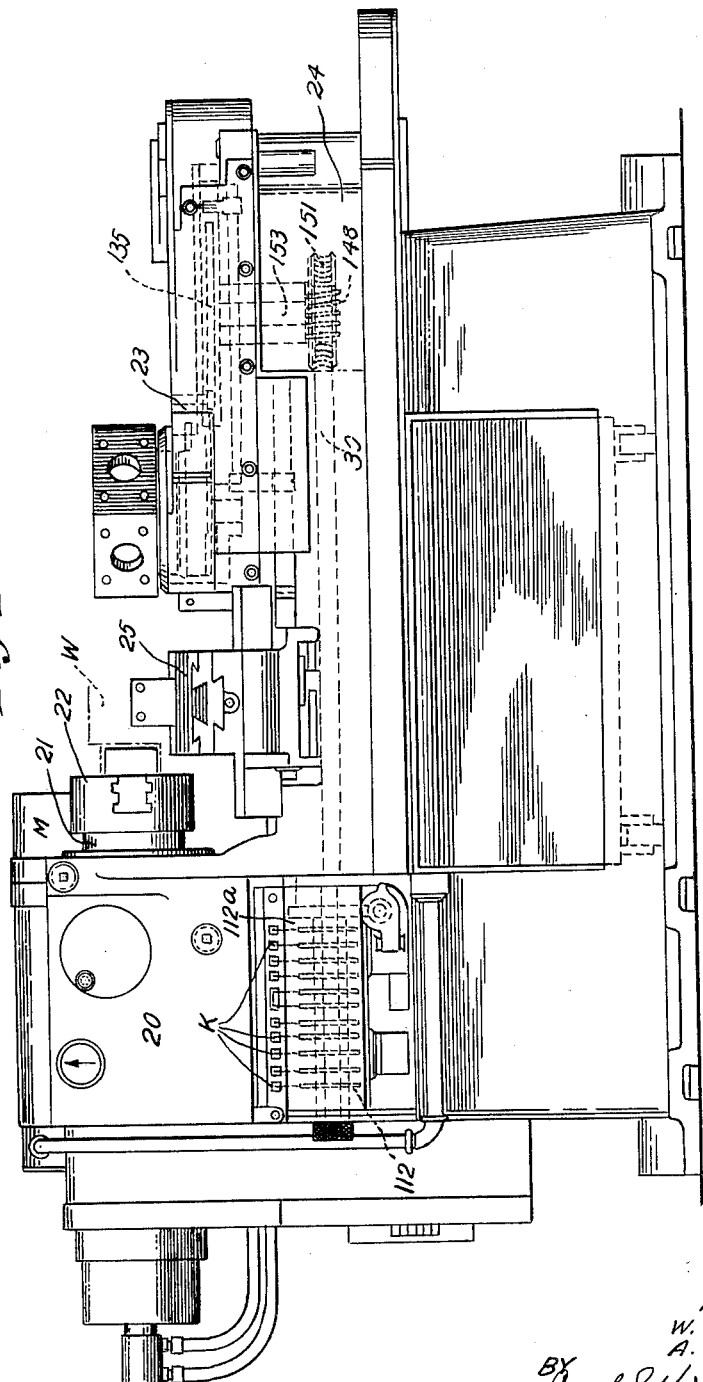
Figure 1 is a front elevation of a machine tool, of the automatic turret type, to which the invention is applied as one illustration of its use.

The machine tool shown in Figure 1 is of the general pattern and organization found in automatic turret lathes, in that it comprises a headstock 20 in which is disposed and journalled a horizontal spindle 21, a gear drive from a source of power M to the spindle, the change-speed mechanism of the present invention, a selective control device 112 is automatically, as well as manually by keys K, controlling the operation of the machine, and the turret lathe further includes a bed 24 disposed at one side of the headstock 20 and upon which the turret slide 23 is reciprocably mounted for movement longitudinally with respect to the spindle and toward and away from the chuck 22 carried on the outer end of the spindle and, also, upon which are mounted the cross-slides 25 disposed between the chuck 22 and the turret slide 23 for reciprocatory movement at substantially right angles to the movement of the turret slide, the turret slide 23 being actuated by the cam 135 which in turn is actuated by a feed shaft 30 from the spindle or spindle drive through a feed-change device and the cross-slide 25 being actuated, preferably, by the movements of the turret slide toward and from the chuck.

As fully described and shown in the copending application above mentioned, the feed shaft 30, is driven from a feed drive, within the headstock (see Figs. 2 and 4) to actuate the turret slide 23 and the cross-slides 25. The spindle 21 and the feed shaft 30 are revolved at different speeds which are automatically selected, there being a driving connection between the spindle and feed shaft by which the rate of feed cutting movement of the tool slides is controlled by the spindle speed. Also, the idle movements of the tool slides toward and from the work are driven at a constant high speed; and the rotation of the spindle may be stopped, under certain conditions during such high speed idle movements of the tool slides, so that the workpiece W in the chuck will not revolve in order that tool marks on the work piece will not occur due to unintentional or accidental contact of the tools with the work during their fast idle motion. Furthermore, the change speed gearing, for varying the rate of rotation of the spindle and of the feed shaft, includes the clutches which are under control of a dog wheel, having a relatively slow peripheral motion, which operates to bring into action power-operated clutch-shifting mechanism to instantaneously shift the selected clutches. This instantaneous shifting of clutches is also particularly useful where it is desired to increase the speed of the spindle to compensate for reduction in cutting speed of the tools on the work, for instance, as the tool proceeds from the work piece periphery inwardly, thus enabling more rapid production of work by the machine under certain conditions as where facing cuts are now performed simultaneously with other cuts.

With the above brief general description, the detailed description of the improved mechanism employed by the present invention will now proceed.

HEADSTOCK

Spindle and spindle drive

Figure 2:
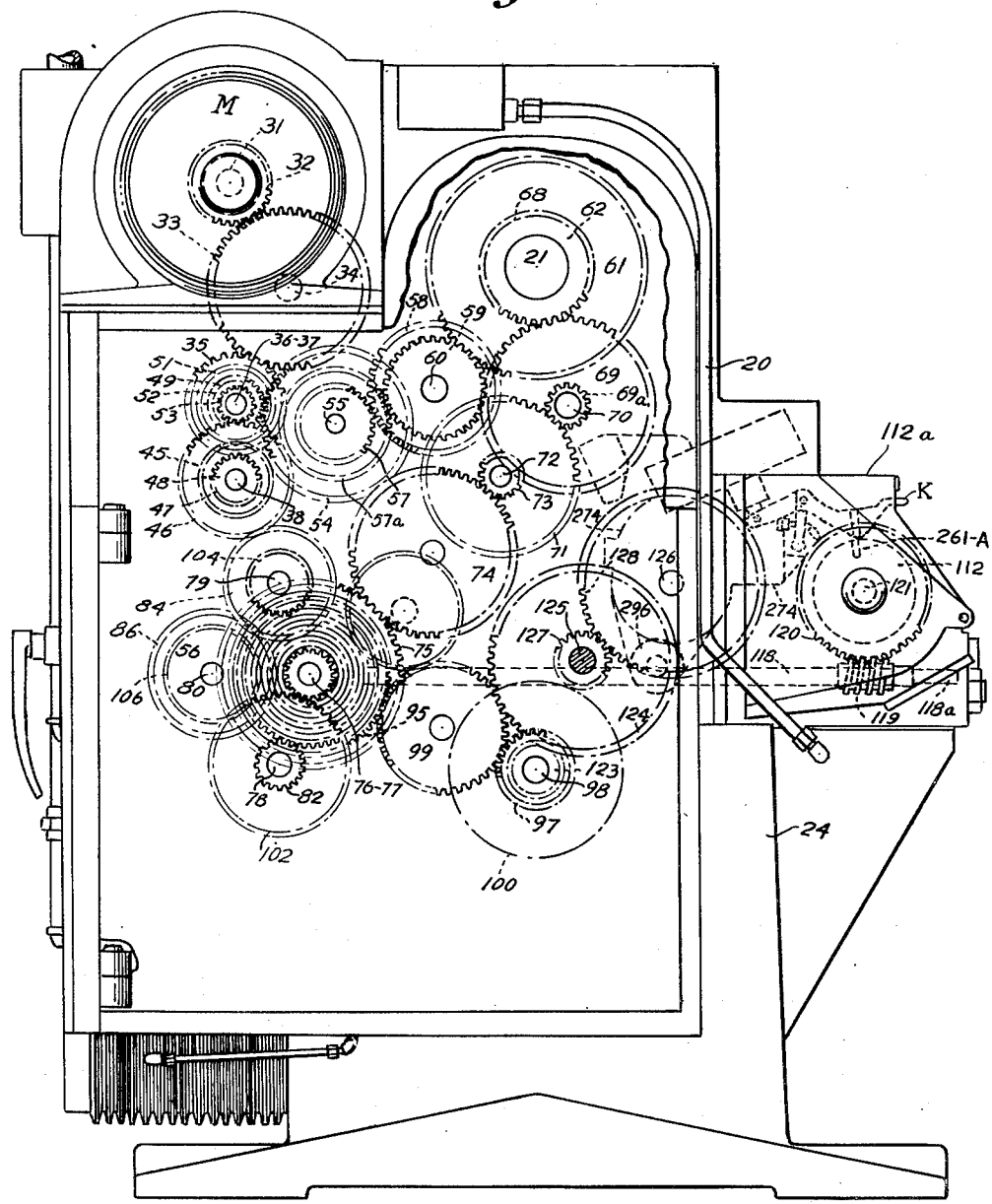
Figure 2 is an end view of the head-stock of the machine tool and looking from the left hand end of Fig. 1, with a portion of the casing broken away to illustrate the gear assembly and the headstock of the machine.

With reference particularly to Figures 1 and 2, the bed 24 of the machine is a casting designed to support and, in some instances, enclose its mechanism, the head-stock end 20 thereof being formed to provide a casing for the power-plant motors, transmission mechanism, including the speed and feed change clutches, and their selective-control and actuating means.

The spindle 21 is rotatably mounted in the ed walls of the head-stock housing 20 in bearings 27 and 28 (see Fig. 3) and is driven from a constant speed motor shaft 31 actuated from a pulley (not shown) or by an electric motor M supported on an end wall of the headstock casing 20. The drive from the motor shaft 31 is through a gear 32 keyed thereon and meshing with idler gear 33 on shaft 34 which idler gear drives gear 35. These shafts and gears run at constant speed while the machine is in operation. From the driving gear 35, the gearing to the spindle 21 includes four automatic speed changes, one pair of hand-changed gears and shiftable gearing for converting the machine into a low or high speed machine, all of which being shown in extended arrangement in Figure 3 and the gearing for operating the feed shaft 30, turret-slide 23, clutch control mechanism 274, etc. being shown in Figure 4, while the entire gearing in Figures 3 and 4 is shown in its assembled arrangement in Figure 2.

With particular reference to Figures 2 and 3, it will be seen that there are two aligned rotatable shafts 36 and 37 mounted in suitable bearings in the heatstock frame 20 and that the driving gear 35 is keyed to one end of the shaft 36 which may be regarded as the speed input shaft and that the shaft 37 may be regarded as the speed output shaft. Journaled in the headstock 20 in cooperative relation and parallel with the aligned shafts 36 and 37 is a rotatable counter-shaft 38 which has rotatably mounted upon it four clutches 39, 40, 41 and 42 arranged in two opposing pairs, each pair being served by a single sliding part or cone, respectively—for instance, clutch heads 39 and 40 being served by the clutch cone 43 and clutch heads 41 and 42 being served by the clutch cone 44—thus, when the clutch cones 43 and 44 are engaged with any one of their clutch heads, the other clutch head of each pair is disengaged. The clutches may be of any suitable type although, in the present showing, disc-clutches are illustrated.

The sliding parts or cones 43 and 44 are splined on the shaft 38 and are shifted by suitable yokes, as can be seen more particularly from Figure 3. Each of the clutch heads 39, 40, 41 and 42 have fast therewith gears 45, 46, 47 and 48, respectively, of different sizes to effect the automatic change speeds desired. The gears 45 and 46 of clutch heads 39 and 40 mesh, respectively, with their mating gears 49 and 50 fast on the speed input shaft 36 while the gears 47 and 48 of clutch heads 41 and 42 mesh with their mating gears 51 and 52 fast on the speed output shaft 37.

It will be recognized that any one of the speed-change operations may be effected automatically by the selecting device 112, or manually by the lifting of certain of the keys K thereof, operably connected through control mechanism 274 (as shown in said copending application, as one example) one to each of the connectors 39°, 40°, 41° and 42°, respectively. The connectors 39° and 40° are connected to opposite arms of a rocker-arm 298 which shifts the yoke 299 to engage the clutch cone 43 with either clutch head 39 or 40, respectively and disengage the other; while connectors 41° and 42° are connected to opposite arms of a rocker-arm 295 to shift the yoke 297 to engage clutch cone 44 with either head 41 or 42 and disengage the other.

The spindle drive continues from the speed output shaft 37 through hand-change gears 53 and 54 to shaft 55. These hand-changed gears are, respectively, fast on the outer ends of the shafts 37 and 55 so as to be accessible for quick manual change through a suitable door in the end wall of the headstock casing 20 and may be provided in groups to obtain different ranges of speeds in a manner and for a purpose well known in the art.

From shaft 55 the machine may be converted from a low speed to a high speed machine, and conversely, but always influenced by the speed changes which are effected by the hand-change gears 53 and 54 and through the automatic clutches just described. By providing shaft 55 with multiple splines 56 on which a double gear 57 and 57ª slides and by moving the double gear 57 and 57ª manually so that either the low speed gear 57 will mesh with its mating gear 58 or the high speed gear 57ª will mesh with its mating gear 59, such change-over may be effected. It will be observed that gears 58 and 59 are keyed to a jack-shaft 60 and that gear 59 is in mesh with a gear 61 keyed to a sleeve bearing 62 in which the rear end of the spindle 21 is splined at 63 for longitudinal adjustment therein. The sleeve bearing 62, as is the shaft 55 and the jack shaft 60, is journaled at 28 in the headstock casing 20 in suitable ball bearings.

Feed shaft drive

The drive for the feed shaft 30 (which actuates the turret slide 23 and cross slides 25 and 26) is connected directly with the spindle 21 so that the feed will always be in ratio per revolution of the spindle regardless of the speed of the spindle. This feed drive is taken off of the spindle sleeve 62 (Fig. 3) which has teeth 68 cut therein meshing with a gear 69. The gear 69 is keyed to a jack shaft 70 which has a spur gear 69ª fast thereto for driving gear 71 keyed to one end of a stub shaft 72 which also has gear 73 fast thereon to drive gear 75 (Fig. 4) through the intermediate gear 74. The gear 75 is keyed to an input speed shaft 76 which is aligned with and rotatably independent of a main or output speed shaft 77 for imparting the requisite movements to the turret-slide 23 and the cross-slides 25.

From this input shaft 76, various feed changes may be obtained through the medium of hand-change gears for the tool slides as well as three automatic feed changes of any selected feed obtained by the hand-change gears. As shown in Figures 2 and 4, three separate and independent counter shafts 78, 79 and 80 are grouped about the aligned input and output shafts 76 and 77 and suitably journaled in the housing 20. Each of these counter shafts 78, 79, and 80 has rotatably mounted thereon a clutch head 81, 83 and 85, respectively, each clutch head having a mating gear 82, 84 and 86 fast thereon, respectively, which gears are of different sizes, and mesh, respectively, with a cluster gear fast to the main feed clutch head 87 rotatably mounted on the output speed shaft 77. The cluster gear comprises three gear members 88, 89 and 90 respectively. Also, each of said counter shafts 78, 79 and 80 has a sliding clutch part or cone 91, 92 and 93, respectively, splined thereon for reciprocating into and out of engagement with the clutch heads on said counter shafts.

The output shaft 77 has a quick return clutch head 94 rotatably mounted thereon and carrying with it a mating gear 95. The clutch head 94 is in opposed cooperative relation with the main feed clutch 87 so as to be served by the clutch slide or cone 96 splined on the shaft 77, whereby one of the clutch heads 87 or 94 will be engaged when the other is disengaged or both disengaged when the cone is in a neutral position. The quick return clutch head 94 is for connecting the shaft 77 with the motor 100 for effecting quick idle motions of the tool slides 23, 25 and 26 and, to this end, its mating gear 95 is driven from a pinion 97 fast on the motor shaft 98 through an intermediate gear 99.

The counter-shafts 78, 79, and 80 are driven from the input shaft 76 through hand-change gears (101, 102, 103, 104, 105 and 106) splined on the ends of said shafts so that they can be readily removed manually through a suitable opening in the casing 20 to effect various ratio combinations of speeds between the input shafts 76 and said counter-shafts in a manner well known in the art. With the selection of hand-change gears shown, the fine or first feed counter-shaft 78 of the feeding mechanism is driven by gears 101 and 102; the second or intermediate feed counter-shaft 79 is driven by gears 103 and 104; and the third or coarser feed counter-shaft 80 is driven by gears 105 and 106, all, as above stated, are hand-change gears well known in the art.

The three automatic changes of speed of feed of the tool slides are obtained in the following manner:

1. For fine feed of movement of the tool slides and all of the clutch cones 91, 92 and 93 being out of engagement with their respective clutch heads, the clutch cone 91 is moved into clutching engagement with the clutch head 81 and cone 96 is moved into engagement with main feed clutch head 87, thus the drive being from input shaft 76 through hand-change gears 101, 102, shaft 78, clutch head 81, gears 82, 88, and main feed clutch head 87 to output shaft 77. It may be noted here that the clutch cone 96 is in engagement with the main feed clutch head 87 during all feeding operations and is only moved out of engagement therewith when it is desired to effect the quick idle movements of the tool slides or when the feed mechanism is hand operated for "setting-up" or the machine stopped;

2. For the second or intermediate feed of the tool slides, and cones 91 and 93 being disengaged from their respective clutch heads, the cone 92 is moved in engagement with clutch head 83, thus the drive being from input speed shaft 76, through hand-change gears 103, 104, shaft 79, clutch head 83, gears 84, 89, and main feed clutch head 87 to output shaft 77; and 3. For the third or coarse feed of tool slides and with the clutch cones 78 and 79 disengaged from their respective clutch heads, clutch cone 93 is moved into engagement with clutch head 85, thus the drive being from speed input shaft 76 through hand-change gears 105, 106, shaft 80 clutch head 85, gears 86, 90, and main feed clutch head 87 to output shaft 77.

It will be recognized that any one of the above described feed-change operations may be effected automatically by the selecting device 112 or manually by lifting certain of the keys K thereof, operatively connected one to each of the connectors 81ᶜ, 81ᵈ, 83ᶜ, 83ᵈ, 85ᶜ and 85ᵈ, respectively as disclosed in the aforesaid copending application. The connectors 81ᶜ and 81ᵈ are connected to opposite arm of a rocker-arm 312 which shifts the yoke 314 to engage or disengage cone 91 with clutch 81; connectors 83ᶜ and 83ᵈ are similarly connected to rocker arm 315 which shifts yoke 317 to engage or disengage cone 92 with clutch 83; and connector 85ᶜ and 85ᵈ are also similarly connected to rocker arm 318 to shift 320 for engaging or disengaging cone 93 with clutch 85. In like manner the cone 96 is shifted to neutral position or into engagement with the main feed clutch 87 by connector 87ᶜ on one end of rocker arm 302 and is shifted into engagement with "fast motion" clutch 94 by connector 94ᶜ on an opposite arm of rocker-arm 302, which actuates the yoke 304.

The mechanism which operates the clutch cones 91, 92 and 93 is to be interlocked (as disclosed in said copending application) so that, when any one of the three clutch cones is operated to engage its clutch head, they automatically disengage any other of said clutch cones that was previously in engagement, this being a safety feature which permits only one of the three feed clutches to be engaged at one time while the other clutch heads and their mating gears run idle on their respective shafts. Also, the counter-shafts 78, 79 and 80 are rotated continuously from the input shaft 76 through their respective hand-change gears while the machine is in operation.

The fast motion of the tool slides 23 and 25 (that is, their idle motion from the time that any tool then in operation has finished cutting and is brought back to clear the subject being machined, the turret indexed, and then moved forward to bring the next set of tools to the subject) is obtained by means of the quick return motor 100, which runs at constant speed continually during operation of machine, through pinion 97 on motor shaft 98 driving gear 99 meshing with mating gear 95 of quick return clutch head 94, which latter is engaged automatically by clutch cone 96, when it disengages the main feed clutch 87, whereby "fast motion" is imparted to output shaft 77. When the tools of the turret slide 23 and/or the cross-slides 25 are again in position for cutting operations on the work-subject, quick return clutch 94 is disengaged and the main feed clutch 87 is engaged by the cone 96 whereby shaft 77 is again brought to feeding motion. When "fast motion" is in operation, cluster gear 88—89—90 runs idle on shaft 77 and shaft 76 runs idle in the end of shaft 77, as shown at point 76ª.

From output shaft 77, "feed" or "fast motion" is transmitted to the feed shaft 30 (which operates turret slide 23 and cross slides 25 and 26) through gear 107 loose on shaft 77 but made fast thereto by means of a safety coupling which comprises, in the present instance, a shear pin 108 held in an annular flange 109 on one face of gear 107, and extending into a disc member 110 disposed with the bushing 109 and keyed to shaft 77. Gear 107 drives gear 111 keyed in feed shaft 30. If load exceeds normal operating conditions shear pin 108 breaks through thereby protecting the mechanisms of the machine. After cause for abnormal load is removed, a new shear pin 108 is inserted and machine is again ready for operation.

A speed and feed control device 112 enclosed in the casing 112ª (Figs. 1 and 2), which automatically controls the operations of all the clutches and therefore the operation of the tool slides in particular, is also driven from gear 107 by bevel gear 113 having an adjustable drive connector, as at 114, with the gear 107, the connector 114 being interengaging teeth or projections on opposing faces of gears 107 and 113 and held in adjusted fixed engagement by the nut 115 and shoulder 116 on shaft 77. Bevel gear 117 keyed on worm shaft 118 meshes with gear 113 and through worm 119 also keyed on shaft 118 drives worm gear 120 keyed on shaft 121 and drives the central device 112, to which dogs 261ª are adjustably fastened that control the automatic operation of the clutches of the machine. It will thus be seen that, by having the gear 107 rotatable on the shaft 77 and coupled thereto by the shear pin 108, the timing between the control device 112 and the feed shaft 30 (and thus the turret slide) and the cross slides 25 will not be altered should any overload, jamming or other incident occur which would cause the shear pin 108 to break.

As shown in Figures 1, 2 and 4, the worm shaft 118 is provided on its outer extremity with a square end 118ª to receive a hand-crank, or other instrument, for hand-cranking the machine for "setting-up" purposes as is well understood in the art.

TOOL SLIDES

As above stated, all movements of the main or turret slide 23 and the cross-slides 25 are actuated from the feed shaft 30 through worm 148, worm wheel 151 on shaft 153 having fast thereon a single disc-cam 135, which latter is engaged by a cam follower 147 carried on slide 23 (see Fig. 1), all as more particularly shown and described in the copending application above mentioned.

The clutch control device 274, as fully described in the aforesaid letters patent, or any auxiliary equipment, may be driven from the quick return motor 100 through gears 123, 124, 127, and 128, which latter is keyed on the shaft 126.

Having thus described the invention in the manner in which it is to be performed, it is to be understood that the precise construction and arrangement shown and described is susceptible of modification and variation. Therefore, the invention in many respects has been claimed broadly so as to permit such variation and change and, in other instances, more specifically.

That which is claimed, as new, is:

1. In a machine having operable parts, the improvement comprising a transmission mechanism between said parts and having a main shaft connected with one of said operable parts, clutch-head rotatably mounted on said main shaft, a shiftable clutch-member splined on said main shaft to engage and disengage said clutch head, a cluster gear rotatable with said clutch-head about said main shaft, a plurality of counter-shafts disposed about said main shaft and each having a clutch-head rotatably mounted thereon and carrying a gear meshing with one of said gears respectively of said cluster gear, a shiftable clutch member on each of said countershafts respectively and splined thereto to engage or disengage its respective clutch head, a gear fast on each of said countershafts respectively, an auxiliary rotatable shaft aligned with one end of said main shaft and having a plurality of gears fast thereon and each meshing with said gears respectively on said countershafts, and a gear connection between said other of said operable parts and said auxiliary shaft, the gear connections between said cluster gear and each of said countershafts being of different ratios and the gear connections between each of said counter-shafts and said other operable part being of different ratios, means for operating said shiftable clutch-members whereby to vary the rate of movement of said operable part connected with said main shaft.

2. In a machine having a driving part and another part to be moved from said driving part for certain of its movements, the improvement comprising a transmission mechanism having a main shaft operably connected with said movable parts, a pair of spaced clutch-heads rotatably mounted on said main shaft, a shiftable clutch-member or cone splined on said main shaft and interposed between said clutch-heads to engage one and release the other and to assume a neutral position, a cluster gear rotatable with one of said clutch heads about said shaft, a plurality of countershafts disposed about said main shaft and each having a clutch-head rotatably mounted thereon and carrying a gear meshing with one of said gears respectively of said cluster gear, a shiftable clutch member or cone on each of said countershafts respectively and splined thereto to engage or disengage its respective clutch head, a gear fast on each of said countershafts respectively and driven from said driving part, the gear connections between said cluster gear and each of said countershafts being of different ratios and the gear connections between each of said countershafts and said driving part being of different ratios whereby the rate of movement of said movable part may be varied when driven from said driving part, a motor in constant operative connection with the other of said clutch-heads on said main shaft to drive said main shaft to move said movable parts for other of its movements when said clutch head is engaged, and means for shifting said shiftable clutch-members.

3. In a machine having a driven part and a slide to be fed in one direction of movement from said driven part, the improvement comprising a feed-change transmission mechanism having a main shaft, a pair of spaced clutch-heads rotatably mounted on said main shaft, a shiftable clutch-member splined on said main shaft and interposed between said clutch-heads to engage one and release the other and to assume a neutral position, a cluster gear rotatable with one of said clutch-heads about said main shaft, a plurality of countershafts disposed about said main shaft and each having a clutch-head rotatably mounted thereon and carrying a gear meshing with one of said gears, respectively, of said cluster gear, a shiftable clutch-member on each of said countershafts, respectively, and splined thereto to engage or disengage its respective clutch-head, an auxiliary rotatable shaft aligned with one end of said main shaft and having a plurality of gears fast thereon, a gear fast on each of said countershafts, respectively, and meshing with one of said gears on said auxiliary shaft, a gear connection between said driven part and said auxiliary shaft, the gear connections between said cluster gear and each of said countershafts being of different ratios and the gear connections between each of said countershafts and said auxiliary shaft being of different ratios, a feed shaft operatively connected with said slide, a gear connection between said feed shaft and said main shaft and including a breakable overload means, and a motor in constant operative connection with the other of said clutch-heads on said main shaft to drive said main shaft for other operations of said slide when said clutch head is engaged, and means for shifting said shiftable clutch-members.

WILLIAM WALLACE POTTER.
ALFRED JOSEPH FULLER.

References Cited in the file of this patent

UNITED STATES PATENTS

| Number | Name | Date |
|---|---|---|
| 2,255,739 | Curtis | Sept. 9, 1941 |
| 2,280,683 | Bedford | Apr. 21, 1942 |